United States Patent [19]

McFarland, Jr.

[11] 3,744,463
[45] July 10, 1973

[54] INTAKE MANIFOLD FOR INTERNAL COMBUSTION ENGINES HAVING A SUDDEN ENLARGEMENT IN THE FLOW PATH OF EACH RUNNER

[75] Inventor: James D. McFarland, Jr., Chatsworth, Calif.

[73] Assignee: Edelbrock Equipment Company, El Segundo, Calif.

[22] Filed: Apr. 2, 1971

[21] Appl. No.: 130,329

[52] U.S. Cl. ..... 123/52 MV, 123/52 M, 123/188 M
[51] Int. Cl. ............................................. F02b 75/22
[58] Field of Search ................ 123/52 ML, 52 MV, 123/52 M, 188 M, 52 MF

[56] References Cited
UNITED STATES PATENTS

| 3,561,408 | 2/1971 | Weiand | 123/52 MV |
| 2,882,875 | 4/1959 | Kolbe | 123/52 MV |
| 3,500,805 | 3/1970 | Reisacher | 123/188 M |
| 3,167,059 | 1/1965 | Love | 123/52 MF |
| 3,653,368 | 4/1972 | Scherenberg | 123/188 M X |
| 3,045,655 | 6/1962 | Formia | 123/188 M |
| 3,393,984 | 6/1968 | Wisman | 123/52 M |
| 2,117,983 | 5/1938 | Reid | 123/52 M |

Primary Examiner—Al Lawrence Smith
Assistant Examiner—Dennis Toth
Attorney—Christie, Parker & Hale

[57] ABSTRACT

A sudden enlargement, in the form of a step, is provided proximate the entrance of each runner of a manifold to the ports of an engine and where mixture velocity is relatively low with respect to mixture velocity elsewhere in the same velocity profile. The enlargements control reverse mixture flow and increase the amount of mixture entering the engine's cylinders. It is believed that this increase in flow is partially due to a reduction or elimination of boundary layer separation in the inlet port. The geometry of the runners is such as to promote relatively high mixture velocity. Specifically, the cross-sectional area of each runner progressively diminishes downstream from the entrance to the runner at the manifold's plenum.

20 Claims, 6 Drawing Figures

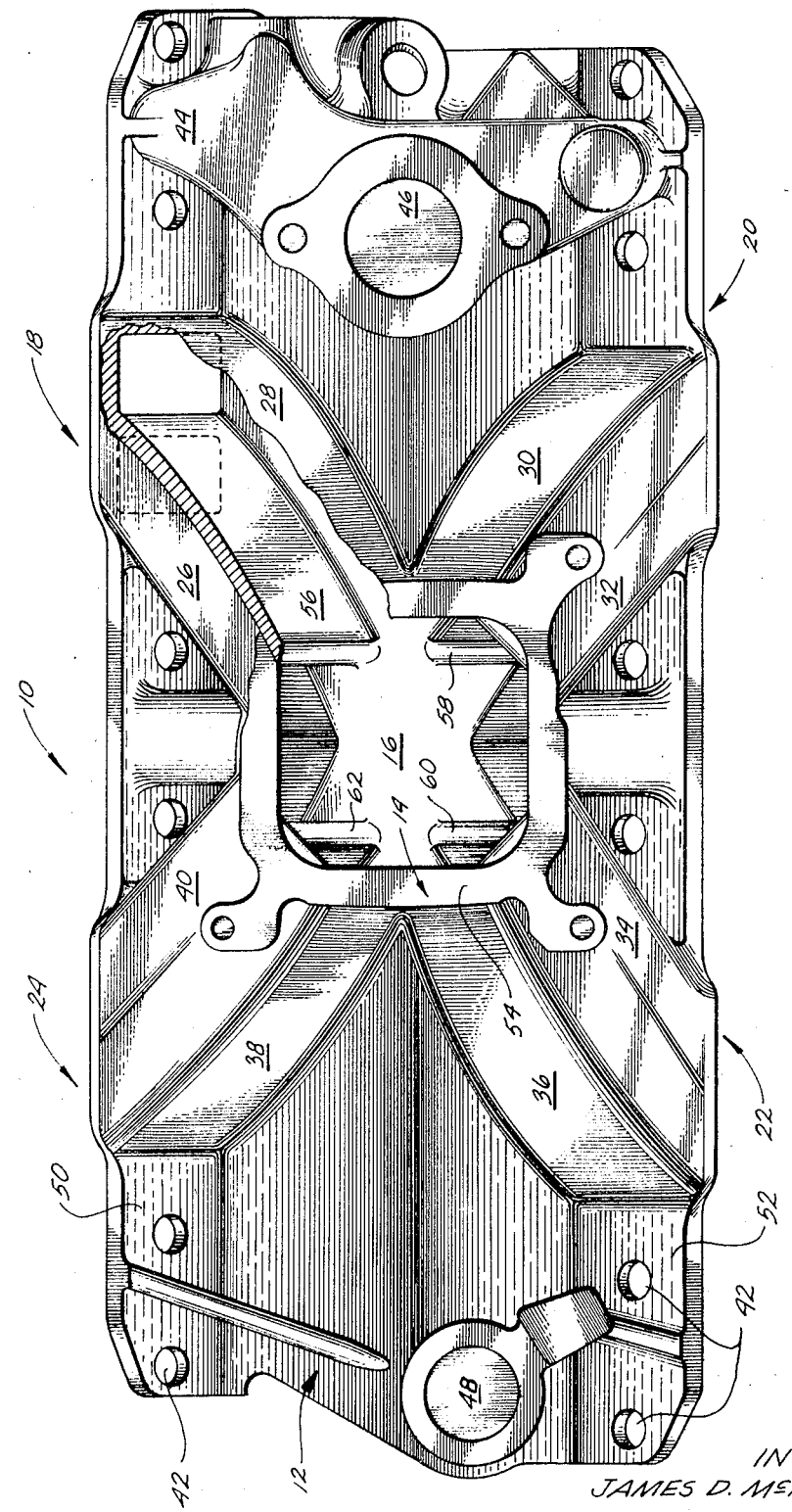

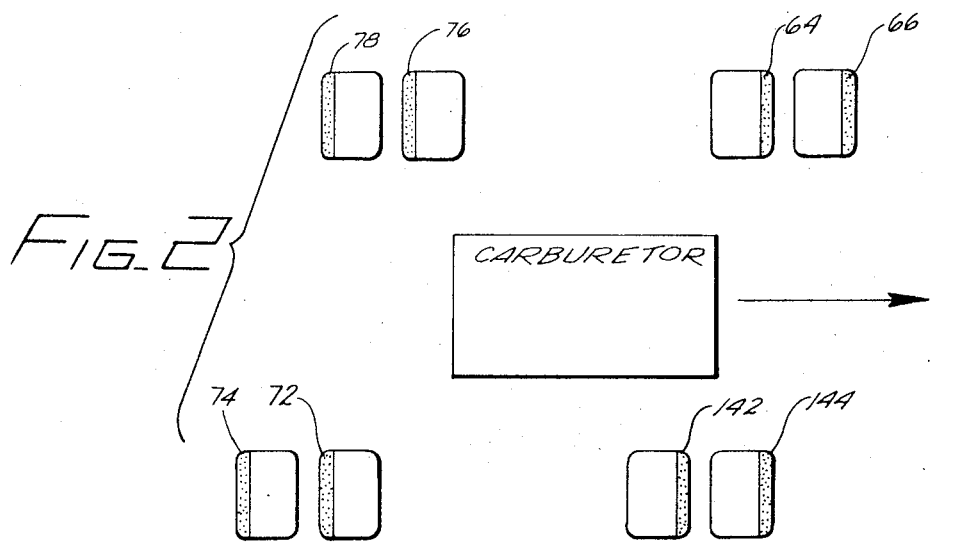
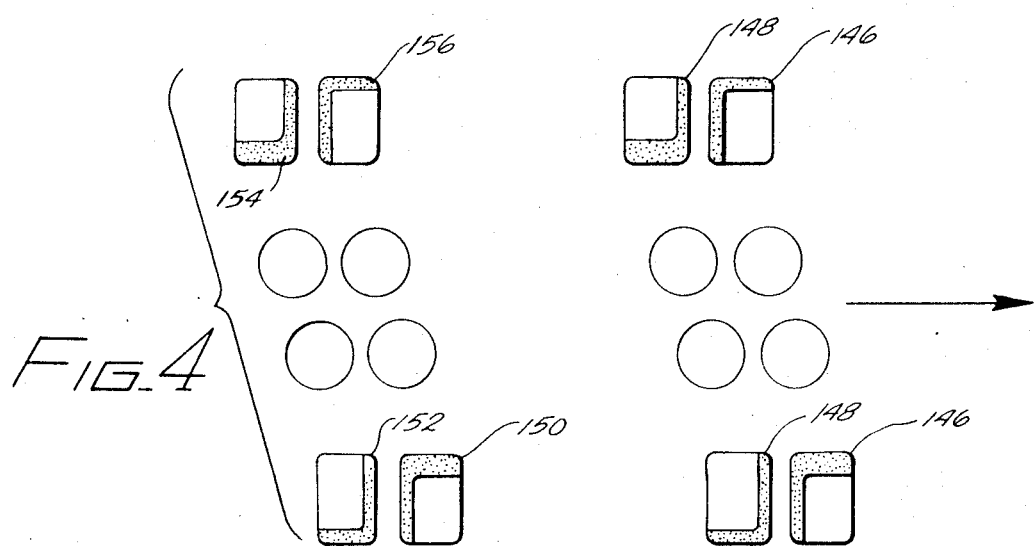
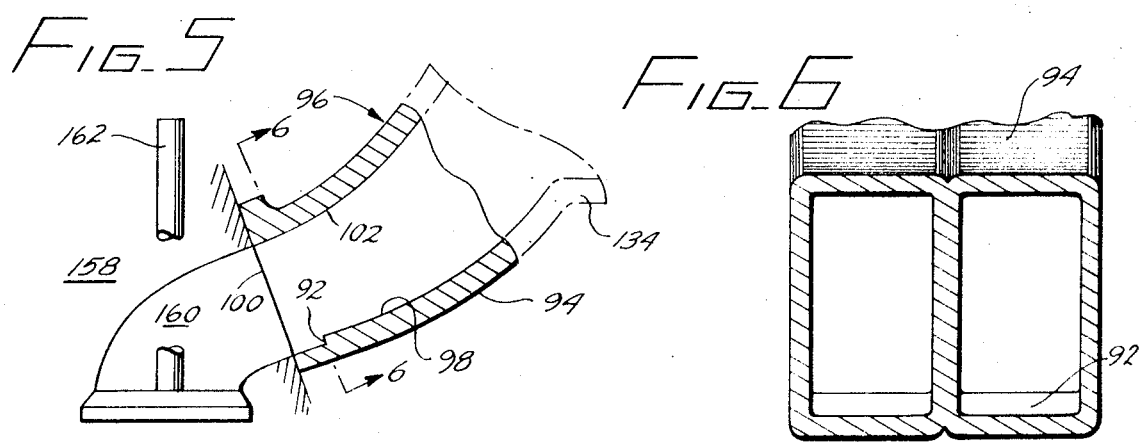

INTAKE MANIFOLD FOR INTERNAL COMBUSTION ENGINES HAVING A SUDDEN ENLARGEMENT IN THE FLOW PATH OF EACH RUNNER

BACKGROUND OF THE INVENTION

The present invention relates in general to intake manifolds for internal combustion engines. More in particular, the present invention relates to intake manifolds of the high performance type.

A carburetted internal combustion engine employs an inlet manifold to distribute a fuel-air mixture produced by the carburetor into the cylinders of the engine. The mixture is drawn into the combustion chambers of the engine by a vacuum created there by piston movement during the "suction stroke" of each cylinder. The amount of work done by the engine to produce the vacuum and draw the fuel-air mixture into the combustion chambers forms a part of the engine's "pumping-friction" work.

In a V-8 engine there are typically eight inlet ports for the passage of the fuel-air mixture into the eight combustion chambers of the engine. An inlet manifold for a V-8 engine communicates the carburetor with the engine's inlet ports through "runners." A runner is a duct or passageway. When two of these "ducts" are side-by-side the combination of the two is often called "a runner" with each duct called "a leg." Usage also permits that each of the side-by-side ducts be called a runner and this meaning will be employed throughout this specification. In any event, individual runners between each of an engine's inlet ports and a plenum of the manifold located immediately below the carburetor are known.

The induction of fuel-air mixtures into an internal combustion engine is an extremely complicated phenomenon and has given rise to several conflicting problems.

One of the most important problems is pumping-friction work. As previously mentioned, a fuel-air mixture is inducted into an internal combustion engine through the manifold. The engine acts as a pump when it produces the vacuum responsible for the pressure drop through the manifold between atmosphere and the combustion chambers, which pressure drop constitutes the driving force acting on the fuel-air mixture. Obviously this pumping requires power. Power lost to flow losses of the mixture through the manifold reduces the engine's output and its efficiency. As a consequence of this, one aspect of good manifold design is to provide minimum losses because of flow phenomena.

Another problem in manifold design is the effect of the pressure history of individual cylinders on other cylinders. Pressure pulses, both positive and negative with respect to atmosphere, travel up and down the runners of a manifold and are generated from such constantly recurring events as inlet valve openings. While a pressure pulse phenomenon can sometimes be used to advantage in augmenting the driving force acting on the mixture during its induction into the cylinders, the phenomenon can actually reduce the driving force unless the phase relationship of the pressure pulses is just right. Pressure pulses can also lead to a problem known in this art as "standoff." Standoff is a condition where fuel-air mixture is forced back through a manifold and carburetor to atmosphere because of a pressure condition existing in the manifold. Standoff occurs at well defined engine speeds for a particular engine-manifold-carburetor combination. Standoff manifests itself as a cloud of gasoline vapor and droplets over the carburetor.

Another problem in good manifold design is to provide a uniform fuel-to-air mixture in each of the cylinders it supplies. Carburetted fuel is a mixture of vaporized fuel, atomized fuel and liquid fuel. Liquid fuel travels along the walls of a runner towards an inlet port under the influence of the gaseous mixture passing through the runner above it and gravity. In practice, this liquid component of the fuel charge has made it extremely difficult to keep fuel-to-air ratios uniform to each of the cylinders of an engine. Atomized fuel is not truly a vapor but is instead very fine particles of liquid. Atomized fuel is carried in suspension by the air stream between the carburetor and the cylinders. Because the particles of atomized fuel are heavier than their carrying air stream there is a tendency for them to come out of suspension when the fuel-air mixture turns a corner. This is because the vapor has a tendency to go straight while the gas wants to turn the corner. When the atomized fuel comes out of suspension, the problem of keeping the fuel-air ratio the same for all cylinders is of course aggravated.

In an effort to maintain atomized fuel in suspension in the mixture stream, it has been the practice to increase the kinetic energy of the atomized fuel by increasing the velocity of the mixture through the runners. The velocity of the mixture is increased by reducing the cross-sectional area of the runners. But the approach of increasing atomized fuel kinetic energy obviously runs into problems when corners or bends in the runners are required, for the fuel particles will strike the outside wall of the bend and come out of suspension.

One of the most popular manifolds produced in this country is the so-called two-plane, over and under, 180° manifold. This manifold has been a standard for most American production V-8 engines for use with a single, standard four-barrel carburetor for some time. The manifold has runners disposed in a relatively complex pattern. The design of the manifold attempts to minimize the problems of efficient fuel distribution, the adverse effects of pressure interference of one cylinder on another cylinder, and standoff. But the two-plane, 180° manifold is a compromise. The twisting, tortuous path of each of the runners produces excellent control of inter-cylinder interference and of standoff but produces poor air-to-fuel ratio uniformity between cylinders and high "pumping-friction" work because of high flow losses.

SUMMARY OF THE INVENTION

The present invention provides a manifold which improves the quantity of fuel and air delivered to an internal combustion engine for a given amount of engine pumping. Stated in other words, the manifold of the present invention is capable of passing fuel-air mixture from a carburetor to an engine in a highly efficient manner and therefore reduces engine pumping-friction work. It has also been observed that the manifold results in good emission performance for the oxides of nitrogen, carbon monoxide, and unburned hydrocarbons.

In general, the present invention envisions a sudden enlargement in the flow path of each runner, inlet port combination. The enlargement is generally in the vicinity of the junction between an inlet port and a runner in the area of the flow path where mixture velocity is low in comparison to the velocity elsewhere in the same velocity profile. Typically, in a runner which provides "line-of-sight" communication between an inlet port and the entrance to a runner from a manifold plenum, mixture velocity in a velocity profile will be highest in the vicinity of the line-of-sight.

Normally the sudden enlargement is in the form of a step between a manifold runner and an associated inlet port at the junction between the two, and with the step facing the inlet port. However, the step need not be at the interface between a port and a runner, depending on manifold and engine type, but should be in the general vicinity of the inlet port. It is believed that the step improves manifold efficiency by reducing or eliminating standoff problems through some sort of capture of reverse flowing fuel and, air mixture and possibly, by reducing or eliminating boundary layer separation in the inlet port just upstream from the inlet valve. It is also believed that the step forms a barrier or dampener against pressure pulses traveling from the inlet port to the manifold's plenum to reduce the problem of inter-cylinder pressure interference.

More specifically, it is believed that the step which, again, faces its inlet port, provides a positive barrier or dampener to prevent pressure waves from traveling upstream in a runner to carry with them fuel and air, and to prevent or attenuate inter-cylinder interference because of these waves. It is not known if the step actually absorbs pressure energy, but the step seems to isolate the inevitable pressure pulses which occur in the induction system acting in opposition to desired stream flow. Secondly, it is believed that the step could result in the energization of the boundary layer in the inlet port to prevent boundary layer separation. Any prevention of boundary layer separation increases the amount of fuel and air which reaches the cylinders for a given amount of engine pumping.

What is believed to be a significant aspect of the present invention is the ability of providing a continuous reduction in cross-sectional area in each runner as it approaches its inlet port. This reduction in cross-sectional area results in ever-increasing stream velocity as the ports of an engine are approached, and a positive velocity gradient which reduces any tendency for boundary layer separation within the runner. The ability to provide for this diminution in cross-sectional area in each of the runners is believed to result from the provision of the discontinuity or step which ensures against boundary layer separation normally associated with rapidly moving streams flowing around corners.

These and other features, aspects and advantages of the present invention will become more apparent from the following description, appended claims and drawings.

BRIEF DESCRIPTION OF THE FIGURES

FIG. 1 is a plan view illustrating a preferred embodiment of the manifold of the present invention with one of its runners slightly broken away to illustrate the runner's interior;

FIG. 2 is a schematic illustrating the mismatch between cylinder head ports and the manifold illustrated in FIG. 1 as seen looking down on the engine;

FIG. 4 is a schematic illustrating the mismatch between cylinder head ports and the manifold illustrated in FIG. 3 as seen looking down on an engine typified by the so-called 427 big block Chevrolet engine;

FIG. 5 is an elevational view, partly in section and in schematic, of a runner of a manifold of the type illustrated in FIG. 3 as it would appear in association with the head of an internal combustion engine; and FIG. 6 is a view taken along line 6—6 in FIG. 5.

DESCRIPTION OF THE PREFERRED EMBODIMENTS

Figure 3:
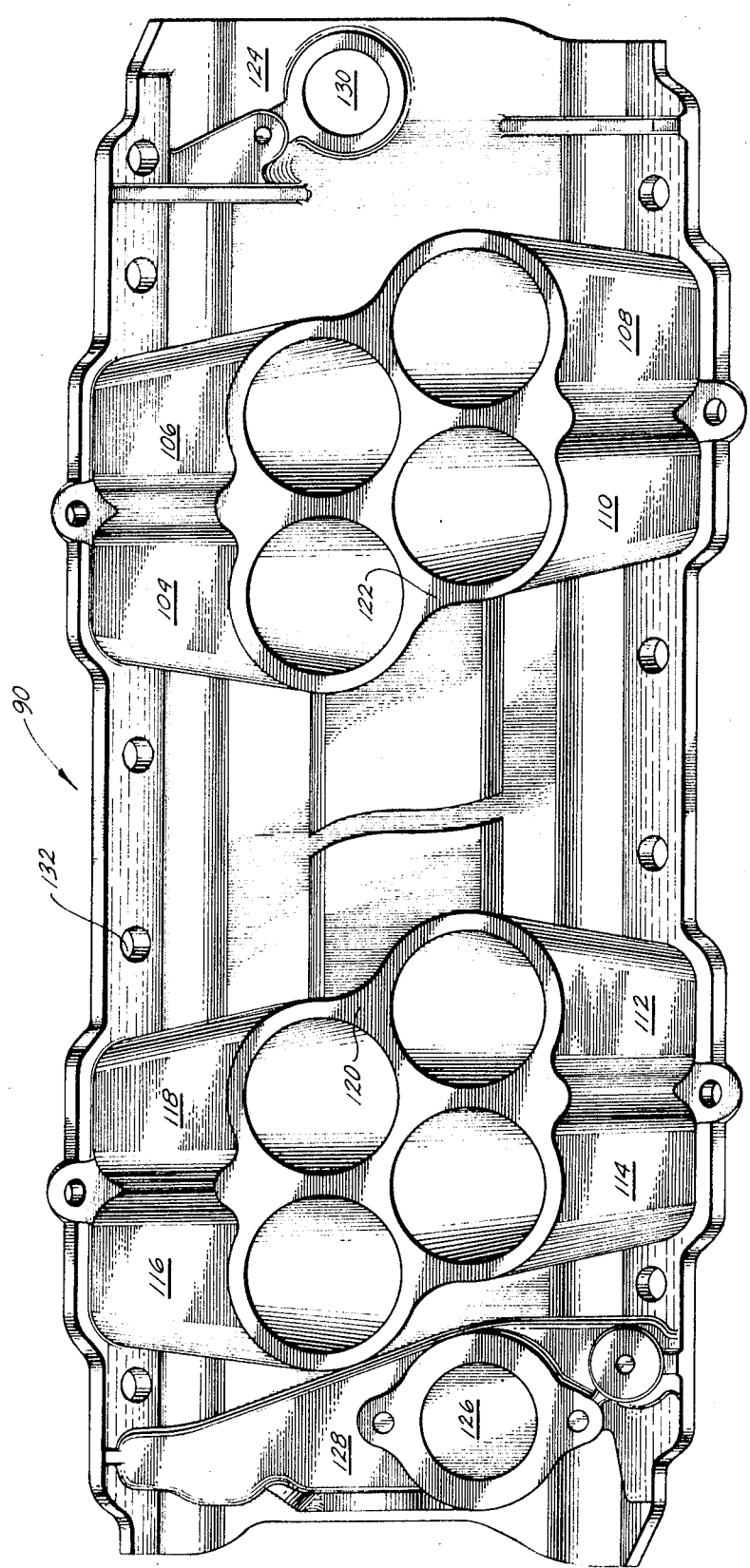
FIG. 3 is a plan view of a ram-type manifold in accordance with an alternate preferred embodiment of the present invention.

With reference to FIG. 1, an improved manifold 10 in accordance with one embodiment of the present invention is illustrated. This manifold is adapted for use with a V-8 engine and a single four-barrel carburetor. In general, the manifold comprises a base 12, a plenum body 14, a plenum 16 defined by the plenum body and four runner pairs 18, 20, 22 and 24. Each runner pair includes individual runners, sometimes referred to as legs. These individual runners are indicated by even-numbered reference numerals 26 through 40 for runner pairs 18 through 24, respectively. Each of the runners is adapted to communicate with an associated inlet port of an internal combustion engine and direct fuel and air from plenum 16 into the inlet ports.

Base 12 of manifold 10 has a plurality of holes 42 for attaching the manifold to the engine it is used with in a conventional manner, as through bolts. Engine coolant crossover passage 44 is provided to communicate the coolant jackets of the heads of the engine used with the manifold. A neck 46 is to communicate the coolant jackets with a radiator. Distributor mounting hole 48 at the opposite end of base 12 is to receive a distributor. The base along its longitudinal sides, indicated by reference numerals 50 and 52, is angled to conform to the angle in the valley between the banks of cylinders of the engine and for proper seating of the manifold on the heads of the engine.

Plenum body 14 has an upper surface 54 which is adapted for the mounting of a single four-barrel carburetor. As is clearly evident from FIG. 1, plenum 16 is in free and open communication with the entrance to each of the runners.

Each of the runners has a configuration to effect, as closely as possible, line-of-sight communciation between plenum 16 and the inlet port of the runner's corresponding inlet port.

As is seen with reference to the runner 28, which is shown partly broken away in FIG. 1, each of the runner pairs has a partition between them. These partitions are indicated by even numbered reference numerals 56 through 62 for runner pairs 18 through 24, respectively.

Each runner progressively diminishes in cross section from plenum 16 to its exit into its associated inlet port. This feature provides for a positive velocity gradient which controls boundary layer separation within the runners and also serves to increase the velocity of the fuel-air mixture passing through the runners. It is believed that this increase in velocity in the particular runner configuration illustrated prevents separation of atomized fuel from the air stream and results in more fuel and air reaching the cylinders as charges.

Manifold 10 is adapted to cooperate with the heads of an internal combustion engine to develop a mismatch between the heads and the manifold at the exits of the runners into the inlet ports of the heads. In other words, there is a mismatch between each runner at its exit and its associated inlet port at the latter's inlet. This mismatch defines a step or sudden enlargement in the flow path of fuel-air mixture passing through the runner and into the inlet port for ultimate passage into the inlet port's cylinder. This step is located in the vicinity of the entrance to the inlet port in an area or zone where the velocity of the fuel-air stream is low relative to the velocity of the stream elsewhere in the same velocity profile. As a general rule, this area or zone of low stream activity is away from the most direct, or line-of-sight path, between the cylinder and the plenum of a manifold. Another way of finding the one where the step should be, in general, is along the long wall of a runner.

For the particular manifold illustrated in FIG. 1, the mismatches, or steps, which produce the sudden enlargement in the flow stream for each runner are illustrated schematically in FIG. 2, as they would appear looking down on top of an engine. The steps are shown to be on the outside wall of each runner and are indicated by the stippel. Specifically, the steps are shown by even-numbered reference numerals 64 through 78 for runners 26 through 40, respectively.

The steps provided by the manifold of the present invention provide a sudden enlargement in a cross-sectional area of each of the runners in the vicinity of its associated inlet port. For the manifold illustrated in FIG. 1 this enlargement may be viewed as a calculated mismatch where a runner meets the head or a step in the runner proper. Again for the manifold illustrated in FIG. 1, the mismatches or steps are on the outside of the port-manifold interface in the area of each runner where stream velocity is relatively low in comparision with the stream velocity along the opposite inside wall. It is not known with certainty why the provision of a step in this area of relatively low stream activity, in a velocity sense, is effective in manifold design, but it is. It is clear that the step itself could provide for some capture of pressure pulses emanating from within the engine and traveling towards the manifold plenum. It is also possible that the step could cause the energizing of a boundary layer in the inlet port and either prevent or reduce the amount of boundary layer separation there. It is expected that any boundary layer separation in the inlet ports of an engine will result in significant reduction in the amount of fuel and air reaching a cylinder, and a corresponding loss of power. The provision of a step also decreases the cross-sectional area in a runner and as a consequence increases stream velocity. This increase in stream velocity may also account, at least in part, for improved manifold performance.

With reference to FIG. 3, a ram-type manifold 90 is illustrated. The concepts of the present invention as applied to this ram-type manifold are again directed to the provision of a sudden enlargement in the cross-sectional area in a flow path between a plenum and the inlet ports to improve manifold performance. As in the previously described embodiment, the enlargements are provided through steps. The steps associated with the runners of this ram-type manifold are again disposed in areas of low stream velocity in a velocity profile proximate the junction of the manifold with a head.

In FIG. 5 a step is indicated by reference numeral 92 for a runner 94 of a manifold 96 which is of the same general type illustrated in FIG. 3. As is seen in FIGS. 5 and 6, where the step is placed need not be at the interface between the head and the manifold, but can be within the runner proper. The point here is that the exact location of the step is a function of the particular type of manifold and the inlet port layout of the engine the manifold is to be used with.

In short, the location of the step is dependent primarily on head design and manifold design. In general, however, it is believed that the steps should be placed in the areas where stream velocity is low in a velocity profile relative to other areas in the same profile. By way of example, in FIG. 5 fuel and air passing through runner 94 experience low velocity along a floor 98 of the runner near its exit 100, while relatively high velocity is observed at a roof 102 of the runner near the runner exit.

Again the provision of a step is belived to augment manifold performance by providing a physical barrier to capture and absorb the energy of upstream traveling pressure pulses, as a boundary layer control vehicle, and as a means of increasing stream velocity.

With closer attention to FIG. 3, the manifold illustrated there is known as a ram-type manifold. In ram-type manifolds the runners are tuned to get a ram effect. Ram effect occurs because negative pressure pulses are generated by the opening of the inlet valves which, when present in certain runner lengths, adds to the driving force available to charge cylinders with fuel and air. The runners lead into an air box or plenum which is not shown. Manifold 90 is adapted to be supplied with two four-barrel carburetors.

The runners of manifold 90 are indicated by even reference numerals 104 through 118. An air box is mounted on top of flat surfaces 120 and 122 and in turn carries the two four-barrel carburetors. The manifold has a base 124. It also has means such as a neck 126 for coupling the engine to the radiator and a passage 128 for communicating the water jackets in the heads of an engine. A hole 130 accepts a distributor. A plurality of holes 132 is provided for mounting the manifold as by bolts or studs to an engine. As is seen to best advantage in FIG. 5, each of the runners begins generally vertical, bends, and increasingly takes a horizontal attitude as the junction between the runner and the head is approached.

It is preferred to equalize the lengths of the walls of each runner. This is shown in FIG. 5 by upper wall 102 effectively beginning vertically above floor 98 in an air box 134. The equalization of wall lengths of each runner presents an entrance cross-sectional area for each runner wherein the mixture velocity and pressure profiles are substantially uniform. This means that there will be no areas in the entrance cross section where mixture velocity will be significantly higher than in other areas in the cross section, and as a consequence friction losses are relatively low. This uniformity in entrance velocity and pressure profiles is particularly important to avoid excessively high velocity profiles along a wall of a runner or close to runner entrance obstructions. In sum, runner entrance geometry is preferably adjusted to eliminate as much as possible high velocity mixture at a wall or against a wall's leading edge.

Again with reference to FIG. 3 each runner typically begins with a circular cross section. This cross section, as is well known, ultimately becomes rectangular to conform to the shape of the cross section at the inlet of the entrance of the inlet port.

As in the manifold described with reference to FIG. 1, it is preferred to reduce the cross-sectional area of each of the runners progressively in ram-type manifolds from the plenum or air box to the inlet ports.

FIG. 4 is provided to illustrate the pattern overlap or steps which define sudden enlargements for a so-called big block "427" Chevrolet engine with a ram-type manifold as viewed looking down on the engine. The steps here are at the junction of the head with the manifold, as they were in the manifold discussed with reference to FIG. 1, and as shown in stipple by even-numbered reference numerals 142 through 156 for runners 104 through 118, respectively. The areas of low stream activity are considerably more pervasive than the areas illustrated with reference to the manifold of FIG. 1. The reason for this is that each manifold has its own peculiar flow characteristics and each engine has its own peculiar flow characteristics. Again, the location of the step or sudden enlargement in the runner has been found to be in the vicinity of the entrance to the inlet port, and the steps face the inlet ports. It is believed again that the steps provide a positive barrier against reverse flow which would otherwise lead to standoff. It is also believed that the steps promote good mixture flow into the cylinders of an engine by preventing the standoff condition and, in addition, the steps promote boundary layer stabilization, and an overall increase in stream velocity.

With specific reference to the Chevrolet "427" and the geometry of the runners of a ram-type manifold for this engine, the areas of high stream velocity are on the roof and the outside walls for those ports turning left, and on the floor and outside walls for those ports turning right. The outside walls in both instances are referred to as such because together with the inlet ports these walls are longer than their opposite "inside" walls.

Again with reference to FIG. 5 it is preferred to have line-of-sight communication between air box 134 and the inlet port associated with each runner. This is readily apparent from the Figure. The Figure also explicitly shows the head of an engine by reference numeral 158. The inlet port is shown by reference numeral 160 and the inlet valve is shown by reference numeral 162. The particular inlet port and manifold shown in FIGS. 5 and 6 are for a Chrysler "Hemi."

The present invention has been described with reference to certain preferred embodiments. The spirit and scope of the appended claims should not, however, be limited to the foregoing description.

What is claimed is:

1. An improved manifold for use in a carburetted internal combustion engine comprising:
   a. a runner for each cylinder of the engine, each runner being adapted to communicate an associated inlet port of the engine with a carburetor; and
   b. each runner providing a sudden enlargement in the flow path it defines in the vicinity of its exit into the inlet port and only in a zone where the stream mixture velocity is low relative to the stream mixture velocities in the same velocity profile.

2. The improved manifold claimed in claim 1 wherein the manifold includes a plenum common to all the runners to receive a gasoline-air mixture from a single four-barrel carburetor.

3. The improved manifold claimed in claim 1 wherein the cross-sectional area of each of the runners progressively diminishes in the direction of the runner's exit into its associated inlet port.

4. The improved manifold claimed in claim 3 wherein the periphery in cross section bounding the flow path of each runner is quadrilateral.

5. The improved manifold claimed in claim 1 wherein the manifold is of the ram type.

6. The improved manifold claimed in claim 5 wherein the manifold is adapted to receive two four-barrel carburetors and independent runners for each of the inlet ports of the engine are provided.

7. An improved manifold for carburetted internal combustion engines comprising:
   a. a plenum for receiving a mixture of gasoline and air from a carburetor;
   b. a runner for each of the cylinders of the engine extending from the plenum to an exit disposed for registration with an associated inlet port of the engine; and
   c. each runner defining a sudden enlargement in the flow path it defines in the vicinity of its exit into the inlet port and only in a zone where the stream mixture velocity is low relative to the stream mixture velocities in the same velocity profile, the enlargement facing the inlet port.

8. The improved manifold claimed in claim 7 wherein the cross-sectional area of the flow path defined by each runner gradually, progressively and continuously diminishes from the entrance to the runner in the plenum to the exit.

9. The improved manifold claimed in claim 7 wherein the sudden enlargement of each runner is defined by a mismatch between the runner and its associated inlet port.

10. The improved manifold claimed in claim 7 wherein the sudden enlargement of each runner is defined at the runner's exit by runner material presenting in an installed manifold a step at the interface between the runner and its associated inlet port.

11. The improved manifold claimed in claim 10 wherein each runner presents a zone of line-of-sight communication between the plenum and the runner's associated inlet port, the line-of-sight in the cross section of the runner containing the step corresponding to the zone where stream mixture velocity is high relative to stream mixture velocity in the vicinity of the step.

12. The improved manifold claimed in claim 11 wherein the flow path of each runner diminishes in cross-sectional area from the entrance to the runner to the runner's exit.

13. An improved ram-type manifold for use with a carburetted internal combustion engine comprising:
   a. a runner for each cylinder of the engine, the center of each runner lying in a plane generally normal to the entrance to the engine inlet port associated with the runner and curving into a generally vertical attitude; and
   b. each runner defining an enlargement in the flow path it defines which faces the exit of the runner and which lies in the vicinity of the runner exit in a zone where stream mixture velocity is low relative to the stream mixture velocities in the same velocity profile, the enlargement being only in the zone.

14. The improved manifold claimed in claim 13 wherein the enlargement of each runner is defined at the runner's exit by the wall of the runner presenting, when installed, a step at the interface between the runner and its associated inlet port.

15. The improved manifold claimed in claim 14 wherein the flow path of each runner diminishes in cross-sectional area from the entrance to each runner to the runner's exit.

16. The improved manifold claimed in claim 13 wherein the enlargement of each runner is defined in the wall of the runner upstream from the runner's exit.

17. The improved manifold claimed in claim 16 wherein the flow path of each runner diminishes in cross-sectional area from the entrance to each runner to the runner's exit.

18. In combination with a carburetted internal combustion engine having an inlet port for each of a plurality of cylinders, an improved manifold comprising:

a. a runner for each cylinder, each runner being adapted to communicate an associated inlet port of the engine with a carburetor of the engine; and b. each runner defining with its associated inlet port an enlargement in the flow path the runner and inlet port define, the enlargement facing the inlet port and being proximate the junction between the inlet port and runner in a zone where the stream mixture velocity is low relative to the mixture velocities elsewhere in the same velocity profile, the enlargement being only in the zone.

19. The combination claimed in claim 18 wherein the cross-sectional area of the flow path defined by each of the runners progressively diminishes in the direction of the runner's associated inlet port.

20. The combination claimed in claim 19 wherein the manifold includes a plenum common to all the runners to receive a gasoline-air mixture from a single four-barrel carburetor.

* * * * *